Figure 1:
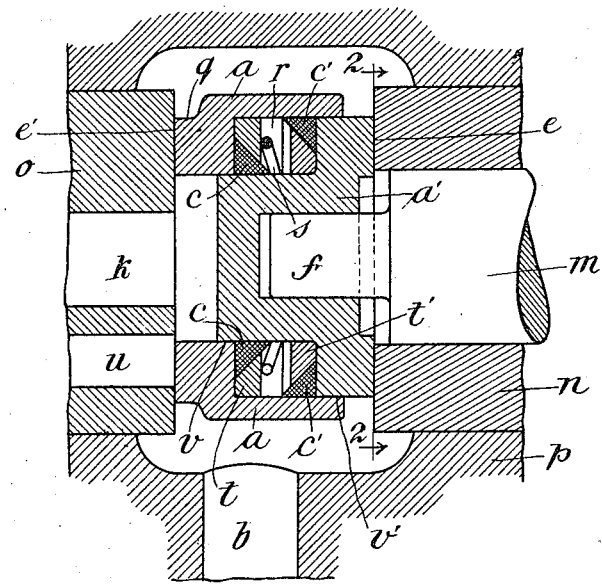

K. PRÖTT.
RING VALVE USED IN PRESSURE WATER MOTORS AND PRESSURE PUMPS.
APPLICATION FILED OCT. 29, 1915.

1,237,693.

Patented Aug. 21, 1917.

UNITED STATES PATENT OFFICE.

KARL PRÖTT, OF HAGEN, WESTPHALIA, GERMANY.

RING-VALVE USED IN PRESSURE-WATER MOTORS AND PRESSURE-PUMPS.

1,237,693. Specification of Letters Patent. Patented Aug. 21, 1917.

Application filed October 29, 1915. Serial No. 58,725.

*To all whom it may concern:*

Be it known that I, KARL PRÖTT, subject of the King of Prussia, residing at Humboldtstrasse 14, Hagen, Westphalia, Germany, have invented certain new and useful Improvements in Ring-Valves Used in Pressure-Water Motors and Pressure-Pumps, of which the following is a specification.

The present invention relates to ring valves used in pressure water motors and pressure pumps for distributing the water within such motors or pumps, and more especially to ring valves which consist of two parts, one of them being mounted on an eccentric prolongation of the distributing shaft, while the other part is pressed against the front surface of the distributing channel tube by aid of a spring or springs inserted between the parts to which is imparted a continuous movement of eccentric rotation, thus alternately opening and closing the distributing parts or channels mentioned above and allowing the pressure water entering by another part to distribute itself over the various channels.

In order to keep the ring valve tight and to prevent the pressure water from passing through between the two parts, the ring valve according to this invention is given the shape of a stuffing box, one part forming a gland, the other part a box and a ring shaped space being left between the gland and the box for two leather packing rings and a spring or springs to be inserted between the rings so as to keep the valve proper firmly pressed against its seat and to press the packing rings against the walls of the packing space in order to keep the joint between the two parts tight, the packing rings being safely protected against all detrimental influences.

Such pressure water however as should pass through the joint into the ring shaped packing space will assist the spring or springs in pressing the valve proper tightly against its seat, thus counteracting the tendency of the main pressure fluid to lift the valve off its seat.

In the drawings annexed to this specification a ring valve according to this invention is shown as applied to a pump or motor.

Figure 2:
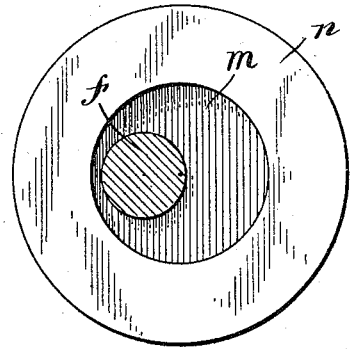

Figure 1 is a longitudinal sectional view; and Fig. 2 is a transverse section on the line 2—2 of Fig. 1.

$m$ is a shaft rotating in a bearing $n$ extending into the valve box $p$ from one side. $o$ is a distributing head provided with a central channel $k$ and a number of eccentrically disposed channels $u$. The ring valve is arranged within the valve box $p$ between the faces $e$ and $e'$ of bearing $n$ and head $o$ respectively. The ring valve proper $a$ has the form of a cap provided internally with a shoulder $q$ so as to present a cylindrical boring in two sections, the one of lesser diameter in proximity to the valve seat $e'$ and the one of a greater diameter directed toward shaft $m$. The other part $a'$ of the ring valve has the form of a step-piston, the part having the smaller diameter being partly inserted and closely fitting in the narrow part of the boring of valve $a$, while the part having the greater diameter is partly inserted and fits closely in the broad part of the boring of the valve. The length of the narrow part $a'$ and of the broad part of valve $a$ is such that a ring shaped hollow space $r$ is left between the parts $a$ and $a'$. Wedge shaped leather packing rings $c$, $c'$ are arranged within said space, and wedge shaped metal rings $t$, $t'$ pressed against said packing rings by a spring $s$ inserted between them tend to press ring $c$ inward and ring $c'$ outward in order to keep the joints tight, the valve $a$ being at the same time pressed against its seat by the spring $s$. An eccentric pin or projection on the sectional face of shaft $m$ is inserted in a boring of part $a'$. Shaft $m$ in rotating around its axis causes parts $a'$ and $a$ to move around in a circle, part $a$ during this motion successively opening and closing the distribution channels $u$ and allowing the pressure fluid forced in by the main channel $k$ to pass through the distributing channels $u$ into the cylinders and back into the valve box $p$ in order to escape through a channel $b$ arranged sidewise. Or else the pressure fluid may enter through $b$ and after passing through the channels $u$ may leave the box through $k$, according to the direction in which the pump or motor is required to rotate.

Some of the pressure fluid entering through $k$ will pass also between the parts $a$ and $a'$ at $v$ and will get into the ring shaped space $r$ between the rings $c$, $t$, $c'$, $t'$, and the pressure acting upon said fluid will serve to press the packing ring $c'$ firmly against its seat. On the other hand, some of the pressure fluid entering through $b$ will pass between $a$ and $a'$ at $v'$ and in filling the space $r$ will press packing ring $c$ against its seat. Thus the pressure fluid itself will assist the spring $s$ in keeping the ring space tight and in pressing the valve proper against its seat so that the pressure fluid is effectually prevented from passing directly from $k$ to $b$ or vice versa. As shown in the drawing, the ring shaped surface $q$ acted upon by the pressure fluid within space $r$ is made equal in size to the effective valve surface so that the pressure exerted upon the surface $q$ by the pressure fluid and by the spring $s$ will be more than sufficient to prevent any fluid from passing between the valve $a$ and its seat $e'$.

I wish it to be understood that my invention is neither limited to pressure water motors or pumps nor to the special construction described above and represented in the drawings. It may as well be applied to any other kind of reversible and non-reversible pressure motor or other engine, and the arrangement of parts may be reversed, the part $a'$ serving as the valve proper while part $a$ is directly connected with the shaft $m$.

I claim herein as my invention:

1. In a ring valve consisting of several parts, one tightly inserted within the other, shoulders on said parts and packing rings on said shoulders between the parts.

2. In a ring valve consisting of several parts, one tightly inserted within the other, shoulders on said parts, packing rings on said shoulders between the parts and a free space between said packing rings.

3. In a ring valve consisting of two parts, the arrangement of the parts within each other after the fashion of the gland and box of a stuffing box, packing rings being inserted between the parts.

In testimony whereof I affix my signature in presence of two witnesses.

KARL PRÖTT.

Witnesses:
FRANZ MÜLLER,
WILH. STEINMEYER.